Dec. 1, 1964    L. W. KINNEY    3,159,430
ACCUMULATING CONVEYOR UNIT
Filed June 10, 1963    2 Sheets-Sheet 1
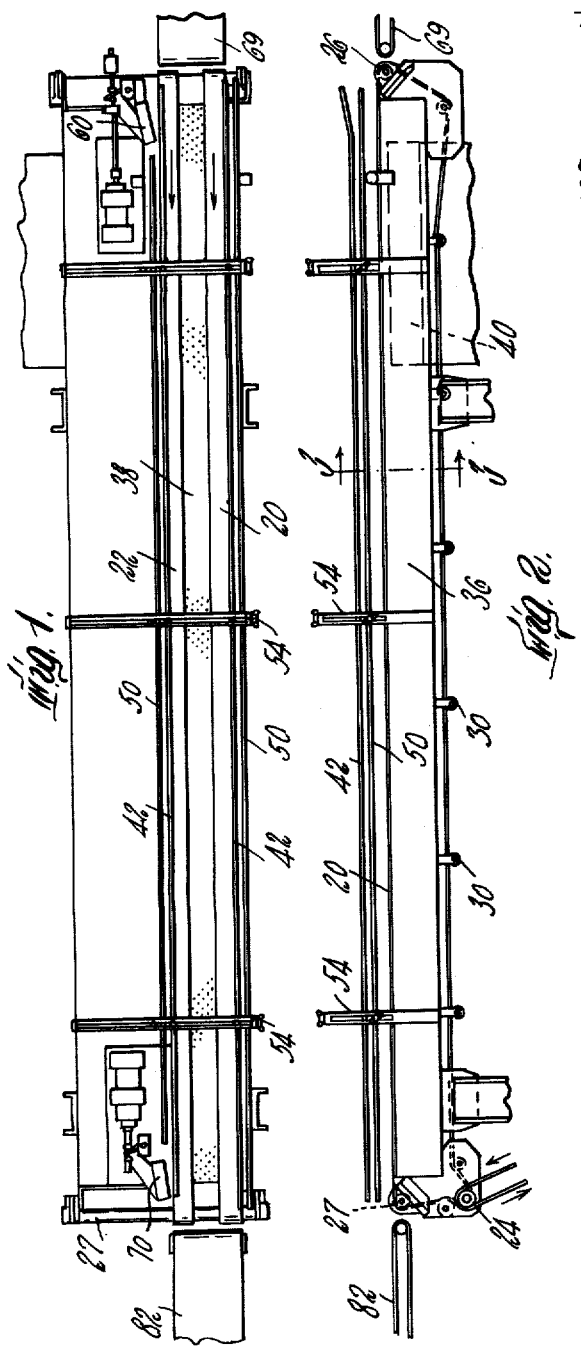
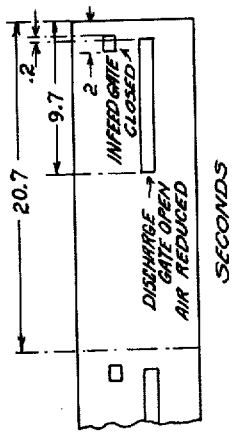
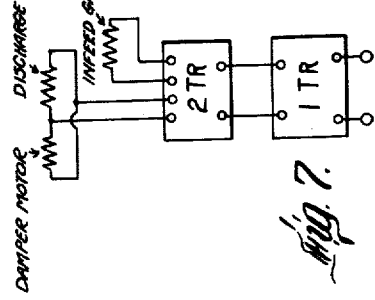
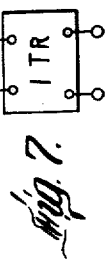
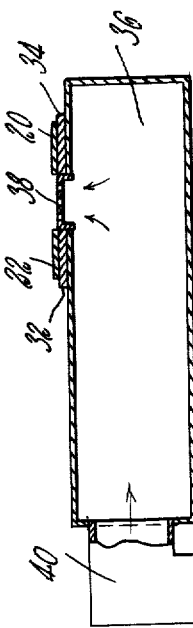
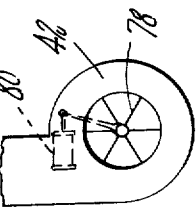

Dec. 1, 1964  L. W. KINNEY  3,159,430
ACCUMULATING CONVEYOR UNIT
Filed June 10, 1963  2 Sheets-Sheet 2
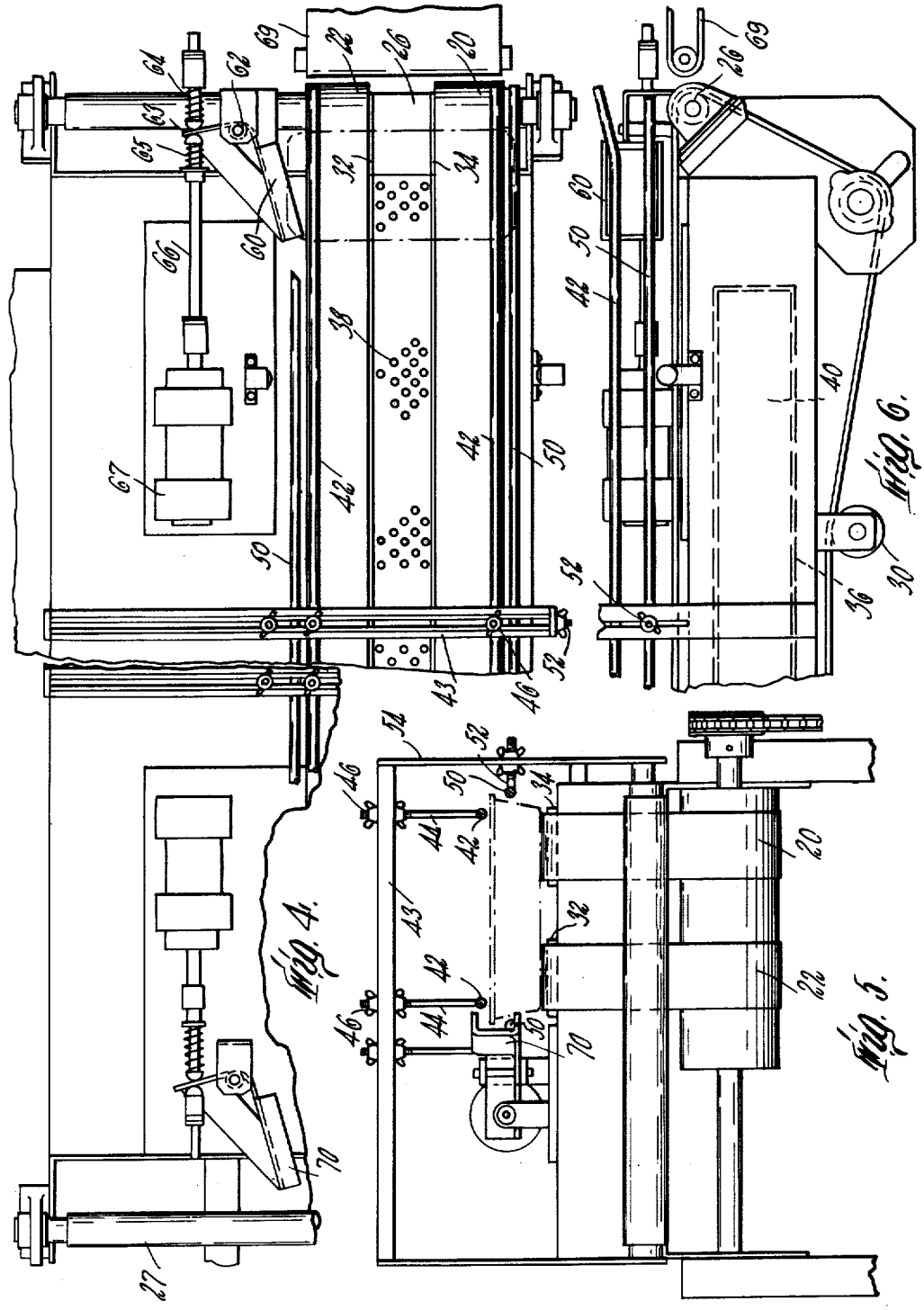

United States Patent Office 3,159,430
Patented Dec. 1, 1964

3,159,430
ACCUMULATING CONVEYOR UNIT
Lawrence W. Kinney, Lynnfield, Mass., assignor to J. W. Greer Company, Wilmington, Mass., a corporation of Massachusetts
Filed June 10, 1963, Ser. No. 286,529
7 Claims. (Cl. 302—2)

This invention relates to conveyors and more particularly to a conveyor unit for accumulating articles advancing in succession into the unit with random spacing and arranging them in contacting Indian file awaiting feed from the unit as a group to some further instrumentality, for example, in the case of food, to a baking oven or a freezing chamber, and for releasing and feeding them as a group out of the unit.

Many food products, particularly frozen food products are now marketed in thin aluminum pans, which upon removal of the wrappings or covers, serve as disposable household cooking or warming dishes for the contents as purchased. The food processor uses these same dishes or pans not only as a packaging medium for his food product but theretofore as a container means for holding his product during processing. While these dishes cannot be regarded as fragile, neither are they rigid, and they are subject to being dented or misshaped if they are subjected to too rough handling during processing. Stoppage and starting of the pans during their conveyance, particularly on relatively high speed conveyors, for example at 100 feet per minute, as when they need to be accumulated, awaiting feed into a processing unit, can be a source of disfigurement of the pans and of spillage or disarrangement of the contents if unsealed.

Accordingly, it is an object of this invention to provide a largely pneumatic stop and start means for intermittently interrupting and then permitting resumption of the travel of such articles along the path of travel of a continuously moving supporting conveyor.

The use of pneumatics for this purpose permits a degree of control over the deceleration and acceleration of the articles and of the accompanying inertia forces which can assure that the most fragile articles can be fed into accumulated contact with each other to form a stopped group, and reaccelerated as a group without damage from their mutual contact and without spillage or disarrangement of their contents, if unsealed.

An accumulator unit of the invention is shown in the accompanying drawings wherein FIG. 1 is a plan view of the unit;
FIG. 2 is an elevational view thereof;
FIG. 3 is an enlarged cross-sectional view taken along the line 3—3 of FIG. 2;
FIG. 4 is an enlarged detail of the unit shown in FIG. 1 broken away to show extent;
FIG. 5 is an end elevational view of the apparatus looking from the discharge end thereof;
FIG. 6 is a detail side view of a portion of the apparatus shown in FIG. 4;
FIG. 7 is a circuit diagram; and
FIG. 8 is a timing cycle chart.

As shown in FIG. 1, the apparatus includes a pair of spaced endless belts 20 and 22 driven by a driving pulley 24 over a suitable set of rolls, including a roll 26 at the infeed end, a roll 27 at the discharge end and a series of supporting return rollers 30.

The belts 20 and 22 along their upper traverses are supported by plates 32 and 34 respectively affixed to the top of a longitudinally extending duct 36 forming a plenum beneath substantially the entire length of the upper traverses. Part of the top wall of the duct 36 is constituted of a perforated plate 38 (FIG. 3), which is located between the two endless belts 20 and 22. The perforations may, for example, provide 23% free area in the plate 38.

Air is fed into the duct 36 through a side inlet 40 which communicates through a series of pipes with a fan 42 (FIG. 3), which is preceded by a vortex damper control 78 operated by a fluid motor 80 for gradually increasing the flow of air to the plenum from a minimum or state of no flow to a maximum and return.

Adjustable pan guides are provided above and along the path of belt travel, including a parallel pair of overhead rods 42 suspended from overhead bars 43 by pairs of vertical rods 44 whose vertical positions relative to the bars 43 may be adjusted by the wing nuts 46.

Horizontal longitudinally extending side rods 50 are similarly supported on one side by transverse spaced rods 52 extending through side bars 54, and on the other side by suspension from overhead bars 43.

A gate member assembly is positioned both at the entrance end and at the discharge end of the unit and since these gates are of substantially duplicate construction, it will suffice to describe the gate member at the entrance end. This gate member 60 is pivoted at 62 and has an abutment 63 which rises between two pins 64 and 65 which are held in spring engagement with the abutment 63. The pin 65 is fixed to a piston 66 operated by fluid motor 67 to pivot the gate 60 in and out of the path of articles being fed onto the conveyor belts between the guides, which have been adjusted to accommodate articles of uniform size.

Where the apparatus is set for a timed cycle, timers may be provided which as shown in FIG. 7 are electrically connected to relays or solenoids which operate the three fluid motors of gate 60, 70 and fan 42 respectively. A preferred cycle of 20.7 seconds is illustrated in FIG. 8. After approximately one second the infeed or entrance gate 60 closes for one second to insure at least some gap between pans that have already advanced onto belts 20 and 22 and the next succeeding pan advancing along input conveyor 69. Normally, however, because of the normal spacing of the pans on conveyor 69, no pan will actually engage gate 60 during this one second period. 0.2 seconds later, discharge gate 70 opens and the damper 78 is closed or partially closed so that any pans accumulated behind gate 70 descend into frictional contact with belts 20, 22 and are discharged onto an output conveyor 82. At the end of 2 seconds, gate 60 opens and loading and unloading without full air discharge continues until, after 9.7 seconds of the cycle, discharge gate 70 closes and the air flow is increased, so that the pans accumulate with the increased air discharge for the remainder of the time cycle and for one second of the next cycle, whereupon infeed gate 60 again closes for one second etc.

As can be understood the damper 78 is controlled to provide through fan 42 a volume of least and maximum air flow which can be varied according to the weight of the individual pans and the exact amount of frictional contact relief which it is desired to permit to prevent damage or spillage during accumulation yet provide proper acceleration when unloading the accumulator. It is important that the amount of frictional contact relief, when accumulating, be such as to still cause forward motion of the products without, however, having the accumulation of succeeding products exert any excessive pile-up pressure on the leading article which has been stopped by the discharge gate. This can be accurately controlled by the open setting of the vortex damper.

Conversely it is desirable to accelerate the articles smoothly when unloading the accumulator. This is accomplished by adjusting the closed setting of the vortex damper so that the air flow is reduced only to the point where frictional contact is sufficient to provide the desired acceleration rate.

These settings may be varied to accommodate articles of varying weights and varying degrees of smoothness of the surface contacting the moving belts thus providing flexibility in operation which is an important feature of the invention.

What is claimed is:

1. Article accumulating equipment comprising a frame, belt means for conveying articles placed thereon along a traverse thereof by virtue of frictional engagement therewith, means for driving said belt means with continuous motion, pneumatic means for periodically reducing the frictional engagement between the bottom surfaces of articles proceeding along said traverse and the top surface of said belt means including a duct forming a plenum underlying said traverse and means for discharging air periodically from said plenum forcibly against the bottom surfaces of said articles as they proceed along said traverse, a gate at the discharge end of said traverse movable into and out of the path of articles proceeding along said traverse, and means for moving and maintaining said gate in the path of said articles while said air is being forcibly discharged against the bottom surfaces of said articles, and means for moving said gate out of the path of said articles to permit said articles to move in frictional engagement with said belt means for ejection from said unit when the force of said air discharge is periodically reduced.

2. Article accumulating equipment comprising a frame, belt means for conveying articles placed thereon along a traverse thereof by virtue of frictional engagement therewith, means for driving said belt means with continuous motion, pneumatic means for periodically reducing the frictional engagement between the bottom surfaces of articles proceeding along said traverse and the top surface of said belt means, including a duct forming a plenum underlying said traverse, means for discharging air periodically from said plenum against the bottom surfaces of said articles as they proceed along said traverse, and means for periodically and alternately changing the pressure of air in said plenum to cause its such discharge to at least partially lift articles out of engagement with said belt means when said plenum is pressurized, a gate at the discharge end of said traverse movable into and out of the path of articles proceeding along said traverse, and means for moving and maintaining said gate in the path of said articles while said plenum is pressurized and means for moving said gate out of the path of said articles and lowering the pressure in said plenum to permit said articles to gravitate back into frictional engagement with said belt means for ejection from said equipment.

3. Article accumulating equipment comprising a frame, a pair of spaced endless belts for conveying articles placed on said belts along a traverse of said belts by virtue of frictional engagement therewith, means for driving said belts with continuous motion, pneumatic means for periodically reducing the frictional engagement between the bottom surfaces of articles proceeding along said traverse and the top surfaces of said belts including a duct forming a plenum underlying said traverse, the top of said duct including a perforate plate extending longitudinally between and below said spaced belts, means for periodically and alternately increasing the pressure of air in said plenum to at least partially lift articles out of engagement with said belts when the pressure in said plenum is increased to drive air forcibly through the perforations in said plate against the bottom surfaces of articles proceeding along said traverse, a gate at the discharge end of said traverse movable into and out of the path of articles proceeding therealong, and means for moving and maintaining said gate in the path of said articles while the pressure in said plenum is increased and means for moving said gate out of the path of said articles and reducing the pressure of air in said plenum to permit said articles to gravitate back into frictional engagement with said belts for ejection from said equipment after said gate is moved out of the path of said articles.

4. Equipment as claimed in claim 3, having a gate at the entrance end of said traverse movable into and out of the path of articles being fed to said equipment, and means for periodically moving said entrance gate into the path of said articles in timed relation with the movement of the discharge end gate out of the path of said articles.

5. Equipment as claimed in claim 4, having control means for moving said entrance gate into and out of said path in timed relation with the movements of said discharge gate.

6. Equipment as claimed in claim 3, wherein said plenum pressure is controlled by a fan and vortex damper control.

7. Equipment as claimed in claim 3, having overhead and side guide rails for guiding pans along said traverse.

References Cited in the file of this patent
UNITED STATES PATENTS 2,506,661   Busse _____ May 9, 1950